United States Patent
Tedijanto et al.

(10) Patent No.: US 6,633,579 B1
(45) Date of Patent: *Oct. 14, 2003

(54) EFFICIENT METHOD FOR STORING MULTICAST TREES

(75) Inventors: Theodore Ernest Tedijanto, San Jose, CA (US); Ravi Thangarajah, Wexford, CA (US)

(73) Assignee: Marconi Communications, Inc., Warrendale, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/176,703

(22) Filed: Oct. 21, 1998

(51) Int. Cl.[7] .............................. H04J 3/26; H04J 3/24
(52) U.S. Cl. ................... 370/432; 370/229; 370/235; 370/254; 370/270; 370/390; 370/396; 370/400
(58) Field of Search ................... 370/229, 235, 370/254, 270, 351, 389, 390, 395, 396, 400, 431, 432; 709/223, 226, 238, 243

(56) References Cited

U.S. PATENT DOCUMENTS

| | | | | |
|---|---|---|---|---|
| 5,233,604 A | * | 8/1993 | Ahmadi et al. ............ 370/60 |
| 5,295,154 A | * | 3/1994 | Meier et al. ............... 375/1 |
| 5,331,637 A | * | 7/1994 | Francis et al. ............. 370/54 |
| 5,459,725 A | * | 10/1995 | Bodner et al. ............. 370/60 |
| 5,600,642 A | * | 2/1997 | Pauwels et al. ............ 370/396 |
| 5,606,669 A | * | 2/1997 | Bertin et al. ............ 395/200.15 |
| 5,630,184 A | * | 5/1997 | Roper et al. ............. 395/200.1 |
| 6,088,333 A | * | 7/2000 | Yang et al. ................ 370/238 |
| 6,094,687 A | * | 7/2000 | Drake, Jr. et al. ......... 709/241 |
| 6,321,270 B1 | * | 11/2001 | Crawley ................... 709/238 |
| 6,327,252 B1 | * | 12/2001 | Silton et al. .............. 370/256 |

OTHER PUBLICATIONS

T. Tedijanto et al. Support for Leaf Initiated Join in PNNI. 1996 ATM Forum/96–1401R3. pp. 1–31.*

* cited by examiner

Primary Examiner—Hassan Kizou
Assistant Examiner—Joe Logsdon
(74) Attorney, Agent, or Firm—Ansel M. Schwartz

(57) ABSTRACT

A system for multicasting. The system includes a network comprising nodes and links connecting the nodes. The system includes a mechanism for forming a multicast connection which does not have overlapping branches. A node for an ATM network. The node includes a forming mechanism for forming multicast connections in the network which do not have overlapping branches as parties are added or deleted from the connections. The node includes a port mechanism which connects to the network through which the connections are sent to the network. The forming mechanism is connected to the port mechanism. A method for forming multicast connections. The method includes the steps of forming a first connection between a first node and a second node. Then there is the step of forming a second multicast connection between the first node and a third node by extending the first connection.

6 Claims, 2 Drawing Sheets

— PNNI
— UNI

PEER GROUP A

NODE A.1's VIEW

NODE B.1's VIEW

NODE A.3's VIEW

EFFICIENT METHOD FOR STORING MULTICAST TREES

FIELD OF THE INVENTION

The present invention is related to multicast connections. More specifically, the present invention is related to multicast connections which have no overlapping branches.

BACKGROUND OF THE INVENTION

Multicast (point-to-multipoint or multipoint-to-point) connections in an ATM network do not necessarily have to form perfect tree graphs to work properly. Branches of a given Be multicast connection can overlap and form "loops" without affecting the correctness of the data flow. Overlapping branches, however, may cause gross inefficiency. A given node on the connection may receive multiple copies of the same data cells unnecessarily, thus wasting bandwidth and processing capacity.

Some multicast connections (e.g., LAN emulation connections) have long holding times. Inefficiency caused by branch overlapping can degrade the overall throughput of the network significantly over a long period of time.

The present invention provides a mechanism for storing and maintaining at the root node of a given multicast connection all the information about the connection necessary to ensure that the connection does not have overlapping branches as parties are added to and deleted from the connection. The stored information is used in conjunction with a path selection algorithm.

SUMMARY OF THE INVENTION

The present invention pertains to a system for multicasting. The system comprises a network comprising nodes and links connecting the nodes. The system comprises a mechanism for forming a multicast connection which does not have overlapping branches.

The present invention pertains to a node in an ATM network. The node comprises a forming mechanism for forming multicast connections in the network which do not have overlapping branches as parties are added or deleted from the connections. The node comprises a port mechanism which connects to the network through which the connections are sent to the network. The forming mechanism is connected to the port mechanism.

The present invention pertains to a method for forming multicast connections. The method comprises the steps of forming a first connection between a first node and a second node. Then there is the step of forming a second multicast connection between the first node and a third node by extending the first connection.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
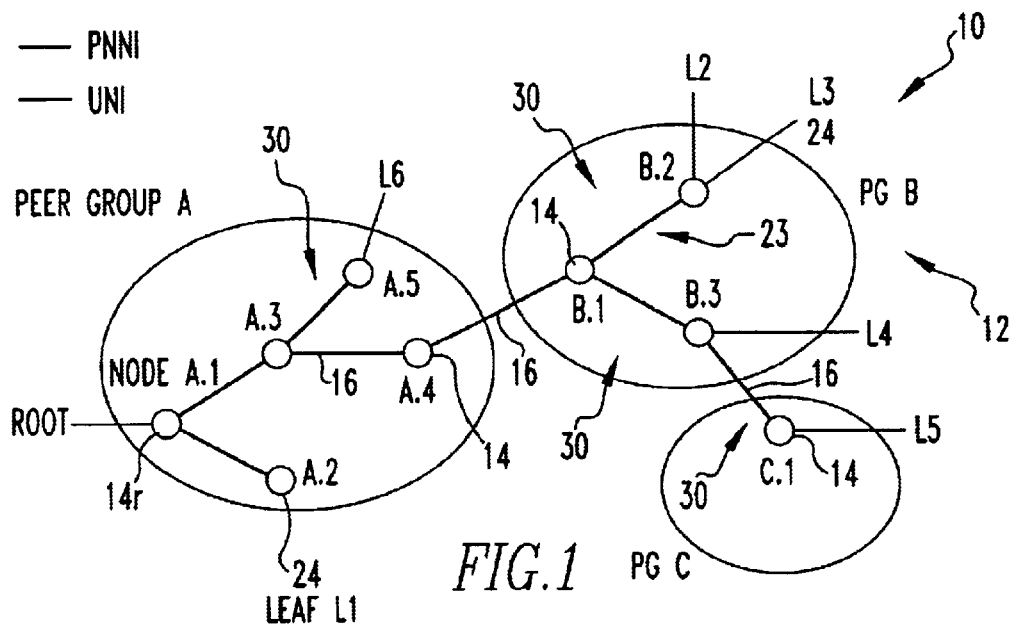
FIG. 1 is a schematic representation of a multicast connection.
Figure 3:
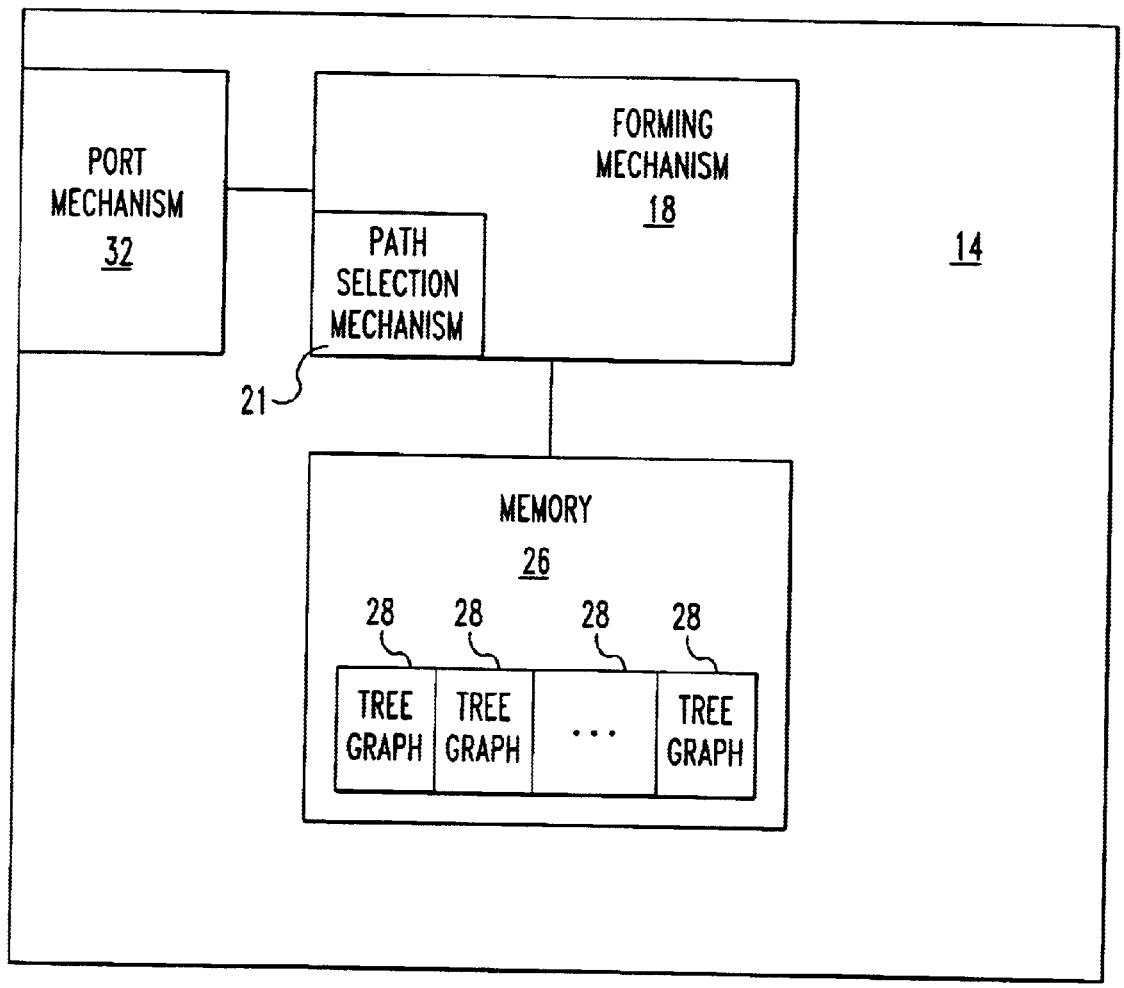
FIG. 3 is a schematic representation of a node of the present invention.

Referring now to the drawings wherein like reference numerals refer to similar or identical parts throughout the several views, and more specifically to FIGS. 1 and 3 thereof, there is shown a system 10 for multicasting. The system 10 comprises a network 12 comprising nodes 14 and links 16 connecting the nodes 14. The system 10 comprises a mechanism 18 for forming a multicast connection which does not have overlapping branches 30 between the nodes 14.

Preferably, the forming mechanism 18 forms multicast connections which do not have overlapping branches 30 as parties are added or deleted from the connections. Each connection preferably has an associated root node 14r of the nodes 14 of the network 12 and the root node 14r includes the forming mechanism 18. Preferably, the forming mechanism 18 stores and maintains at the root node 14r all information about the connection necessary to insure that the node forms multicast connections which do not have overlapping branches 30 as parties are added or deleted from the 11 connections.

A connection preferably defines a path 23 of node 14, links 16 and leaves 24 and wherein the forming mechanism 18 includes a path selection mechanism 21, as is well known in the art, for selecting a path 23 for the connection. Preferably, each node 14 has a memory 26 and wherein the information about the connection includes the links 16, nodes 14 and leaves 24 of the path 23 as represented by a tree graph 28 stored in electrical form in the memory 26. The leaves 24 and nodes 14 of a path 23 for a connection across a single PNNI peer group preferably define a DTL and when a leaf 24 is added all the links 16 used in the DTL that are not already on the tree graph 28 are added to the tree graph 28 and the leaf 24 is added to the last link 16 added to the tree graph 28.

Preferably, each node 14 of the path 23 maintains a corresponding tree path 23 for the path 23 from the node 14 to all leaves 24 downstream of the node 14. Each node 14 preferably has an associated forming mechanism 18 which maintains the corresponding tree path 23, and wherein the links 16 of the path 23 include branches 30, and when a leaf 24 is removed any branches 30 not connected to any leaves 24 downstream of the branches 30 are also removed. Preferably, the root node 14r maintains a reference count for each PNNI branch 30 of the path 23, and whenever a reference count becomes 0, the associated PNNI branch 30 is deleted, where a reference count of a PNNI branch 30 is equal to the number of the child branches 30, and a leaf branch 30 is deleted when its corresponding leaf is removed from the connection.

The present invention pertains to a node 14 for an ATM network 12. The node 14 comprises a forming mechanism 18 for forming multicast connections in the network 12 which do not have overlapping branches 30 as parties are added or deleted from the connections. The node 14 comprises a port mechanism 32 which connects to the network 12 through which the connections are sent to the network 12. The forming mechanism 18 is connected to the port mechanism 32.

Preferably, each node 14 includes a memory 26 having information about each connection necessary to ensure that the forming mechanism 18 forms multicast connections which do not have overlapping branches 30 as parties are added or deleted from the connections. The information about the connection preferably includes a path 23 of nodes 14, links 16 and leaves 24 which define the connection. Preferably, the links 16, nodes 14 and leaves 24 of each path 23 is represented by a tree graph 28 stored in electrical form in the memory 26. The forming mechanism 18 preferably maintains a reference count for each PNNI branch 30 of each path 23, and whenever a reference count becomes 0, the associated PNNI branch 30 is deleted, where a reference count of a PNNI branch 30 is equal to the number of the child branches 30, and a leaf branch 30 is deleted when its corresponding leaf 24 is removed from the connection.

The present invention pertains to a method for forming multicast connections. The method comprises the steps of forming a first connection 50 between a first node 14a and a second node 14b. Then there is the step of forming a second multicast connection 52 between the first node 14a and a third node 14c by extending the first connection 50.

Preferably, after the first connection forming step there is the step of forming multicast connections from the first node 14a with additional nodes 14 without the multicast connections having any overlapping branches 30. The multicast connections forming step preferably includes the step of forming multicast connections which do not have overlapping branches 30 as parties are added or deleted from the connections.

Preferably, each node 14 has a memory 26 and each connection defines a path 23 of nodes 14, links 16 and leaves 24 and before the multicast forming step there is the step of storing the links 16, nodes 14 and leaves 24 of the path 23 as represented by a tree graph 28 in electrical form in the memory 26. At least one connection preferably comprises leaves 24, links 16 and nodes 14 of a path 23 across a single PNNI peer group which defines a DTL, and the forming a connections step includes the steps of adding a leaf to the path 23, and adding links 16 used in the DTL that are not already on the tree graph 28 to the tree graph 28 and the leaf is added to the last link 16 added to the tree graph 28.

The following definitions are applicable for a better understanding of the operation of the preferred embodiment.

ADD PARTY: The signaled message indicating that a request is being made to join a new leaf 24(endpoint) to an existing multicast connection.

ADD PARTY REJECT: The signaled message indicating that an attempt to add a new party to a multicast connection has failed.

Bandwidth: The theoretical capacity of nodes 14 or links 16 in a network 12 to transmit data.

Branches 30: A partial graph; a portion of a tree.

Connection: A signaled circuit connecting two (or more) nodes 14 in the network 12.

DTL: Designated Transit List. A list of nodes 14 and links 16 that completely specify a path 23 across a single PNNI peer group.

DROP PARTY: The signaled message indicating that a request is being made to remove a leaf 24 (endpoint) from an existing multicast connection.

Leaf 24: On a directed tree graph 28 a vertex with only a single branch attached.

Leaf User: A node 14 which is designed as one of the destinations of the data stream.

LGN: Logical Group Node 14. An abstract representation of a lower level peer group as a single point for purposes of operating at one level of the PNNI routing hierarchy.

Link 16: An abstract representation of the connectivity between two logical nodes 14.

Multicast: The transmission of data from a single source over a network 12 to several destinations simultaneously.

Network 12: A group of nodes 14 connected by links 16 over which data can be transmitted.

Node 14: An abstraction representing a single instance of the PNNI routing protocol.

Path 23: A route through a network 12 from a specific source node 14 to a specific destination node 14.

Peer Group: A set of logical nodes 14 which are grouped for purposes of creating a routing hierarchy.

PNNI: Private Network 12 to Network 12 Interface or Peer Network 12 to Network 12 Interface. Also designates a protocol based upon a standard created by the ATM Forum. The Specification of Version 1.0 was ratified in 1996, incorporated by reference herein.

Port: The point of attachment of a link 16 to a node 14.

RELEASE: The signaled message to request a connection to be torn down.

Root User: The node 14 which is designated the source of the data stream.

SETUP: The signaled message indicating that a request is being made to establish a new connection.

Tree: A graph of a network 12.

UNI: User to Network 12 Interface. Also designates a protocol based upon a standard created by the ATM Forum.

In the operation of the preferred embodiment, each node 14 traversed by a multicast connection stores some information about the connection to ensure that DTLs are computed in such a way that no two branches 30 overlap. The view of a multicast connection described below represents the information that each node 14 stores for this purpose.

There may be cases where, due to instability in the network 12, branch 30 overlapping cannot be avoided (see PNNI Errata item #28, incorporated by reference, herein. In these cases, on a given node 14 traversed by a multicast connection there may be multiple instances of the given multicast connection. Each of these instances is identified by a unique (incoming interface, call reference) combination. One connection view is maintained for each instance of the multicast connection.

A node 14's view of a multicast connection is a tree graph 28 rooted at the node 14, with PNNI nodes 14 as vertices, Leaf users as the leaves 24, and PNNI and UNI links 16 as the branches 30. (A leaf 24 on a tree graph 28 is a vertex with only one branch 30 attached to it.)

Branches 30 can be divided into the following two classes based on the objects connected to them:

PNNI branch 30: an branch 30 that connects two PNNI nodes 14

Leaf branch 30: an branch 30 that connects a party to a PNNI node 14

The following terms are used to describe some relationships between branches 30 with respect to their relative positions in the tree graph 28:

Parent branch 30: an branch 30 that is directly attached upstream (i.e., in the direction towards the root of the tree) from a given branch 30.

Child branch 30: an branch 30 that is directly attached downstream (i.e., in the direction away from the root of the tree) from a given branch 30.

For the node 14 to which the root node 14r is directly attached or an entry border node 14, the PNNI links 16 comprising the tree graph 28 are all the ports that have been included in DTLs generated by the node 14 for the multicast connection. For a lowest-level node 14, the PNNI links 16 comprising the tree graph 28 are all the ports to which the node 14 has forwarded SETUP or ADD PARTY messages for the given multicast connection.

Figure 2A:
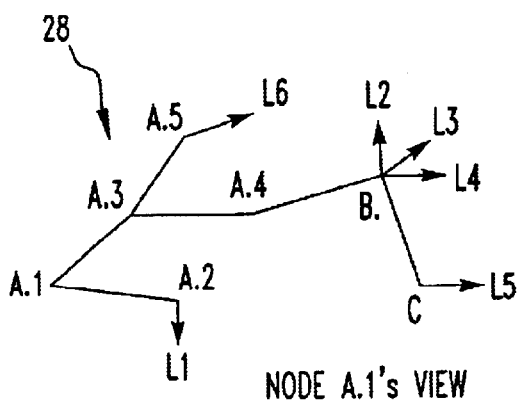
FIGS. 2a, 2b, and 2c are schematic representations of corresponding views from node A.1, A.3, and B.1, respectively, of the multicast connection of FIG. 1.
Figure 2C:
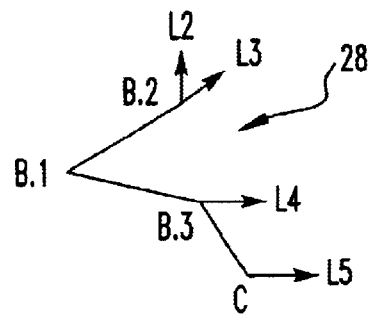
Figure 2B:
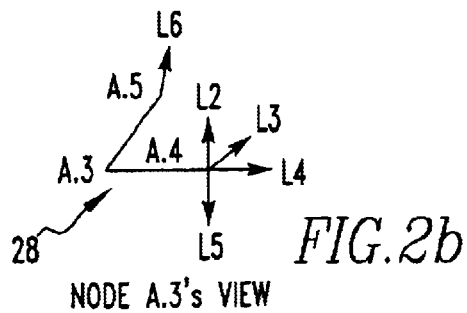

When computing a path 23 to a new Leaf 24, the DTL originator takes the view of a multicast connection into account, ensuring that the new path 23 does not cause a loop in the tree graph 28. Likewise, an entry border node 14 takes its view into account when computing lower-level DTLs. A lowest-level node 14 uses its view to determine a particular port to forward an ADD PARTY to the next node 14 if there are multiple parallel links 16 and the lowest-level DTL specifies a zero port ID. Generally, an entry border node 14 of an area, such as B.1 in FIG. 1 maintains all the information for its area, so the root node 14r sees the areas B and C as simply node B.1. But in terms of root node A.1's view, as shown in FIG. 2a, since node B.1 has all the information about the tree downstream of it, root node A.1 sees the entire multicast connection of areas B and C.

FIG. 1 and FIGS. 2a, 2b and 2c show an example of a multicast connection and the corresponding views at various node 14 on the connection.

A node 14 maintains its view of a multicast connection as Leaves 24 are added and dropped. When a leaf 24 is added, all the links 16 used in the DTLs that are not already on the tree graph 28 are added to the graph, and the leaf 24 is attached to the last link 16. When a leaf 24 is dropped, the leaf and all the branches 30 leading to the leaf 24 from the nearest branching point are removed from the tree graph 28. For example, if leaf L5 drops from the connection, node 14 B.1 takes leaf L5 and branch B.3→C out of its view, node 14 A.3 takes out L5, and node 14 A.1 takes out L5 and branch B→C.

The maintenance of a connection view can be simply implemented using reference counts. A reference count is maintained for each PNNI branch 30 on a connection view. A PNNI branch 30 is deleted from the tree graph 28 whenever its reference count becomes zero. The reference count of a PNNI branch 30 is equal to the total number of its child branches 30. These child branches 30 may be either leaf or PNNI branches 30. There is no reference count maintained for leaf branches 30. A leaf branch 30 is deleted from the tree graph 28 whenever the corresponding leaf is dropped from the connection.

Using the example in FIG. 1, branch B.1→B.3's reference count is 2, and that of branch B.3→C is 1. When L5 is deleted from B.1's view, the reference count on branch B.3→C goes to zero and so the branch is deleted. The reference count on branch B.1→B.3 goes down to 1, so this branch stays.

A node's view of a multicast connection is maintained by adding and deleting leaves 24. A reference count is associated with each PNNI branch 30, and it is defined to be the number of its child branches 30. These child branches 30 can be either PNNI or leaf branches 30. A PNNI branch 30 is deleted from the view when its reference count becomes zero. There is no reference count maintained for a leaf branch 30. A leaf branch 30 is deleted from the view when the leaf 24 is deleted.

A leaf branch 30 is identified by an endpoint reference. This endpoint reference is the one used locally to identify the corresponding leaf at the outgoing interface. When the endpoint references are cleared (using a DROP PARTY or RELEASE message), the corresponding branch 30 is removed from the connection view.

A leaf 24 is added to a node's connection view when the node 14 forwards a SETUP or ADD PARTY message to add the leaf to the connection. The following procedures are followed when adding a leaf:

If the node 14 generates DTLs for the SETUP or ADD PARTY, the node 14 adds to the view all the PNNI links 16 contained in the generated DTLs that are not already on the tree graph 28. The leaf is then attached to the destination node 14 specified by the generated DTLs. Note that if the node 14 is the node 14 to which the root node 14r is directly attached, the destination node 14 is the node 14 or logical group node 14 (LGN) containing the leaf. If the node 14 is an entry border node 14, the destination node 14 is the LGN specified as the next transit in the DTLs received by the border node 14.

If the node 14 does not generate any DTL for the SETUP or ADD PARTY (i.e., it is a transit node 14) and the message is forwarded on a PNNI link 16, the node 14 adds to the view the PNNI link 16 and attaches the leaf to the remote end point of the link 16.

If the node 14 does not generate any DTL for the SETUP or ADD PARTY and the message is forwarded on a UNI link 16, the node 14 attaches the leaf to the node 14 itself.

When an branch 30 (leaf branch or otherwise) is added to the view, the reference count of its parent branch 30, if any, is increased by one.

A leaf is deleted from a node's connection view when signaling deletes the associated party from the connection, i.e., when any of the following events happens:

The node 14 receives a DROP PARTY for the leaf 24.

The node 14 receives an ADD PARTY REJECT for the leaf 24.

The node 14 receives a RELEASE on the interface to which the leaf 24 was added

The interface to which the leaf was added fails.

When a leaf 24 is deleted from the view, the leaf branch 30 is also deleted. If the leaf branch 30 has a parent branch 30, the reference count of the parent branch 30 is decreased by one. If its reference count goes to zero, the parent branch 30 is also deleted, causing the reference count of its parent branch 30 (if any) to be decreased by one, and so on.

When a node 14 needs to compute DTLs to route a SETUP or ADD PARTY for a new leaf user for a multicast connection, it takes its view of the connection into account to ensure that the new DTLs will not result in a violation of the branch 30 overlapping restriction. Likewise, when a lowest-level node 14 needs to determine a particular PNNI link 16 to forward an ADD PARTY to, it takes its view into account to ensure that not more than one link 16 is used to reach the next node 14.

The Appendix describes a possible implementation of the system 10.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

APPENDIX

Data Structures

Multicast Connection identifier

Type: mcon_id_t
Fields:
portid     (unsigned integer) port ID of the root-side interface of the
           connection
c_ref      (unsigned integer) call reference for the connection at the
           root-side interface DTL Transit Type: dtl_transit_t
Fields:
nodeid     (22 byte node ID) ID of the transit node
portid     (unsigned integer) ID of the transit port Edge Type: mcon_edge_t
Fields:
dtl        (dtl_transit_t) DTL transit represented by this edge,
           also used as a key to identify the edge
parent     (mcon_edge_t pointer) pointer to the parent edge
refcnt     (integer) number of child edges Leaf Type: mcon_leaf_t
Fields:
parent     (mcon_edge_t pointer) pointer to parent edge Multicast Connection Type: mcon_t
Fields:
id         (mcon_id_t) ID of the multicast connection
leaves     binary tree of mcon_leaf's indexed by end point reference
edges      binary tree of mcon_edge's indexed by edges' dtl field Routines Adding a Leaf Arguments:

mcon       (mcon_t) the affected multicast connection
leaf       (mcon_leaf_t) the leaf to be added
dtl        (array of dtl_transit_t's) the DTL computed for the given leaf;
           the DTL transits in dtl are in reverse order, i.e., from
           destination to source Local variables:

hop         (dtl_transit_t) DTL transit
prev_edge   (mcon_edge_t) previous edge
is_merged   (boolean_t) true when the DTL to be added merges with the tree
edge        (mcon_edge_t) edge being examined currently

BEGIN:

```
    set hop to first transit in dtl;
    prev_edge = 0;
    is_merged = false;
    tree = mcon->edges;
    while (hop is a valid DTL transit) {
       find an edge in tree matching hop
       if not found {
          if is_merged is true {
             /*
              * Try to branch out after merging with tree, ignore rest of
              * dtl and return.
              */
             return;
          }
          /*
           * Else, create edge and add to tree
           */
          create edge with hop as id and add to tree;
          if (prev_edge) {
             prev_edge->parent = edge;
          }
          else {
             leaf->parent = edge;
          }
```

APPENDIX-continued

```
        edge->refcnt++;
    }
    else { /* edge found */
        if is_merged is false { /* first time hitting an old branch */
            is_merged = true;
            if (prev_edge) {
                prev_edge->parent = edge;
            }
            else {
                leaf->parent = edge;
            }
            edge->refcnt++;
        } /* else do nothing */
    }
    prev_edge = edge;
    set hop to next transit in dtl
    } /* while */
END
```

Deleting a Leaf

Arguments:

```
mcon       (mcon_t) the affected multicast connection
leaf       (mcon_leaf_t) the leaf to be deleted
```

Local Variables:

```
parent_edge  (mcon_edge_t) the parent edge being processed
child_edge   (mcon_edge_t) the child edge from parent edge leading to leaf
BEGIN:

parent_edge = leaf->parent;
    while (parent_edge is a valid edge) {
        /*
         * Decrement reference count to account for the leaf drop
         */
        parent_edge->refcnt--;
        if (parent_edge->refcnt != 0) {
            /*
             * There are other leaves still reachable from this edge, just return
             */
            return;
        }
        child_edge = parent_edge;
        parent_edge = child_edge->parent;
        /*
         * Last leaf reachable from edge to be removed, drop the edge
         */
        Remove child_edge from mcon->edges;
    }
END
```

What is claimed is:

1. A system for multicasting comprising:

a network comprising nodes and links connecting the nodes; and a mechanism for forming multicast connections which do not have overlapping branches between the nodes, the forming mechanism forms multicast connections which do not have overlapping branches as parties are added or deleted from the multicast connections, each connection has an associated root node of the nodes of the network and the root node includes the forming mechanism, the forming mechanism stores and maintains at the root node all information about each connection necessary to insure that each connection forms multicast connections which do not have overlapping branches as parties are added or deleted from the connections, a connection defines a path of nodes, links and leaves and wherein the forming mechanism includes a path selection mechanism for selecting a path for the connection, each node in the connection has a memory and wherein the information about the connection includes the links, nodes and leaves of the path as represented by a tree graph stored in electrical form in the memory, the leaves and nodes of the path for a connection across a single PNNI peer group define a DTL and when a leaf is added all the links used in the DTL that are not already on the tree graph are added to the tree graph and the leaf is added to the last link added to the tree graph.

2. A system as described in claim 1 wherein each node of the path maintains a corresponding tree path for the path from the node to all leaves downstream of the node.

3. A system as described in claim 2 wherein each node has an associated forming mechanism which maintains the corresponding tree path, and wherein the links of the path include branches, and when a leaf is removed any branches not connected to any leaves downstream of the branches are also removed.

4. A system as described in claim 3 wherein the root node maintains a reference count for each PNNI branch of the path, and whenever a reference count becomes 0, the associated PNNI branch is deleted, where a reference count of a PNNI branch is equal to the number of the child branches, and a leaf branch is deleted when its corresponding leaf is removed from the connection.

5. A node for an ATM network comprising:

a forming mechanism for forming multicast connections in the network which do not have overlapping branches as parties are added or deleted from the connections;

a port mechanism which connects to the network through which the multicast connections are sent to the network, said forming mechanism connected to the port mechanism; and a memory connected to the forming mechanism having information about each connection necessary to ensure that the forming mechanism forms multicast connections which do not have overlapping branches as parties are added or deleted from the connections, the information about each connection includes a path of nodes, links and leaves which define each connection, the links, nodes and leaves of each path is represented by a tree graph stored in electrical form in the memory, the forming mechanism maintains a reference count for each PNNI branch of each path, and whenever a reference count becomes 0, the associated PNNI branch is deleted, where a reference count of a PNNI branch is equal to the number of the child branches, and a leaf branch is deleted when its corresponding leaf is removed from the connection.

6. A method for forming multicast connections comprising the steps of:

forming a first connection between a first node and a second node;

forming multicast connections from the first node with additional nodes without the multicast connections having any overlapping branches as parties are added or deleted from the connections; and forming a second multicast connection between the first node and a third node by extending the first connection, each node has a memory and each connection defines a path of nodes, links and leaves and before the multicast forming step there is the step of storing the links, nodes and leaves of the path of each connection as represented by a tree graph in electrical form in the memory, at least one connection comprises leaves, links and nodes of a path across a single PNNI which defines a DTL, and the forming a connections step includes the steps of adding a leaf to the path, and adding links used in the DTL that are not already on the tree graph to the tree graph and the leaf is added to the last link added to the tree graph.

* * * * *